Patented Apr. 10, 1934

1,953,924

UNITED STATES PATENT OFFICE 1,953,924

PROCESS OF MANUFACTURING CEMENTITIOUS MATERIALS

Alton J. Blank, Puebla, Mexico, assignor to Cement Process Corporation, a corporation of Delaware No Drawing. Application November 23, 1932, Serial No. 644,083

6 Claims. (Cl. 106—25)

This invention relates to the manufacture of cementitious materials, and more particularly to improvements upon the low temperature processes of producing cementitious materials disclosed in my copending applications Serial No. 623,597, filed July 20, 1932, and Serial Nos. 644,084 (now Patent No. 1,912,883) and 644,085, filed November 23, 1932.

The present invention is based upon my discovery that the use of certain accelerating or improving agents appears to effect a marked increase in the strength values obtained and to bring about other improvements in the properties of the products produced by the use of the low temperature processes above mentioned. Agents of this type that I have found to improve the products of these processes are ordinary salt, calcium chloride, sodium hydroxide and tannic acid. I am aware of the fact that others have used these agents and other agents that may be regarded as equivalent thereto for effecting certain improvements in the setting and strength properties of cementitious materials. However, the results obtained by me in my investigations go to show that such agents produce in the products of my above mentioned low temperature processes a much greater degree of enhancement of desired physical properties than might have been predicted from their effect on the cementitious materials with which they have heretofore been used. I believe that this is due at least in part to the fact that these agents are introduced into my product at a different stage in its manufacture and under conditions radically different from those under which they have been used by the prior workers. But regardless of the reason therefor, the results are notable.

I have found, for example, that when a 1% sodium chloride solution is used as the mixing water for hydrating the free lime component of a mixture of two parts of caustic lime and one part of argillaceous material, e. g., diatomaceous earth, and the resulting mixture is subjected to grinding in a tube mill in the presence of moisture and at a temperature sufficient to promote the reaction of the lime and the siliceous components of the mixture in accordance with the teaching of my copending application Serial No. 644,084 above-mentioned, the tensile strengths for test samples stored for 24 hours, 3 days, 7 days and 28 days under standard testing conditions for Portland cement are increased very considerably. In addition to products containing no Portland cement addition, samples were also obtained for test wherein Portland cement had been incorporated in the tube mill. An improvement in the properties of the products was observed in each case.

In carrying out the tests referred to above, sufficient water was added to effect hydration of the material and also to insure the presence of a small amount of free water in the materials during the grinding operation in the tube mill. The temperature during the grinding and mixing stage was controlled to the point where the exiting product showed a temperature of approximately 150° C.

In the tests above indicated, the accelerating agent was added in the mixing water used for hydration of the caustic lime. If desired all or part of the agent may be added after the hydration step and during the final grinding and mixing stage with similar results.

In lieu of diatomaceous earth various other argillaceous materials may be used. Among others I have tested successfully are tripoli, river sand, and clay. In fact, particularly satisfactory results have been obtained in bringing up the strength properties of products that otherwise would have shown relatively low strength values as compared with products produced by the use of more carefully selected and higher grade argillaceous materials. For example, tests conducted upon a series of products obtained by introducing caustic lime and tripoli into a tube mill with an excess of water over that required for hydration, and with and without varying amounts of Portland cement addition, showed that when a 1% sodium chloride solution is added in the tube mill remarkable increases in the strength values, particularly in the early periods, are obtained. Increases of strength of approximately 50% were noted for the 24-hour test; the 3 day and 7 day tests showed increases of approximately 20% and increases of approximately 30% were obtained at the end of 28 days. These improvements in strength were obtained with a substantial decrease in the setting time. With the addition of a 2% sodium hydroxide solution, an improvement of 45% in the tensile strength at the end of 24 hours was observed. The tensile strength value for 3 days showed an increase of over 40%; the value for 7 days showed an increase of approximately 10% and the value for 28 days showed an increase of approximately 2½%. With the use of a 2% calcium chloride solution a strength improvement of 36% was recorded at the end of 24 hours, without any diminution of strength at the end of 3, 7 and 28 days.

The setting times were considerably shortened when sodium hydroxide and calcium chloride were employed.

Similar tests with tannic acid indicate that additions of tannic acid to the mixing water for the hydrating step in the proportion of around 0.02% will impart to the product still greater increases in strength values than any of the other agents above mentioned.

As pointed out in my copending applications above mentioned, it has been found that the most satisfactory results are obtained when the argillaceous material employed is reduced, either in a preliminary grinding operation or in the course of the low temperature reaction stage, to a relatively fine state, say, to a fineness where approximately 90% will pass a 200 mesh screen, or even finer.

Furthermore, while the presence of a small amount of free water appears to be essential to insure that the desired reactions between the lime and the siliceous and aluminous components of the mixture are brought about in the tube mill grinding operation the amount of water present in this stage should be kept low and always should be insufficient to produce wet grinding conditions. Therefore, the amount of free water present will never exceed about 50%, even with highly absorptive materials, such as diatomaceous earth, and with less absorptive materials may not exceed 30%. Except when the hydration of caustic lime is to be carried out in the tube mill simultaneously with the mixing and grinding thereof with the argillaceous materials of the mix, the percentage of water present will generally be far below the maximum permissible to maintain dry grinding conditions. However, a considerable range of choice is permitted within the limits of the range above indicated, since the water originally present or added in the grinding stage is always largely removed in the course of the grinding operation under the influence of the temperature maintained. At the same time, because of the fact that the amount of water added in the course of the process may be varied over a considerable range, it is possible to vary the quantity of water used so as to insure the introduction of the desired amount of accelerating agent in the form of a solution or dispersion even when dealing with agents of this class that have a relatively low solubility. However, when dealing with the agents above named, no difficulty is met with on this score. With the exception of tannic acid, all are very soluble. Although less soluble, tannic acid dissolves with sufficient ease in water so that sufficient of it is carried in a small proportion of water to produce the desired results.

While the invention has been described with particular reference to certain accelerating agents, it is to be understood that others that have heretofore been recognized as accelerating the setting and hydrating reactions of hydraulic cement may be employed. It is also to be understood that the accelerating agents may be added in the dry form in the intermediate stages of the process with beneficial results. Under the influence of the temperature and moisture conditions and through the mixing and grinding action in the tube mill, and as well in the hydrator, in case hydration is carried out as a separate operation and the accelerating agent is added in that stage, such agent is disseminated throughout the mixture and is enabled to perform the desired functions.

It is to be understood that the present disclosure is for the purpose of illustration only, and that the invention includes all the modifications and equivalents which fall within the scope of the appended claims.

I claim:

1. The process of producing a cementitious product which comprises mixing a calcareous material containing lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, and previously reduced to a fineness of approximately 90% through a 200-mesh screen or finer, said mixing being carried on in the presence of an amount of water sufficient to insure hydration of any quick lime present and sufficient to insure the presence of free moisture in the mixture throughout the mixing operation, and in the presence of an accelerating agent, and, while mixing, maintaining the mixture at a temperature of at least about 100° C., and not exceeding about 400° C., to produce mutual reactions between the lime and the siliceous components of said material.

2. The process of producing a cementitious material which comprises grinding a calcareous material containing lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, said grinding being carried on in the presence of sufficient water to insure hydration of any quick lime present and sufficient to insure the presence of free moisture in the mixture of materials throughout the grinding operation, and in the presence of an accelerating agent, and, while grinding, maintaining the mixture at a temperature of at least about 100° C., and not exceeding about 400° C., to produce mutual reactions between the lime and the siliceous components of said material, and continuing said treatment until the mixture has been reduced to a state of subdivision of approximately 90% through a 200-mesh screen or finer.

3. The process of producing a cementitious product which comprises mixing a calcareous material containing lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, and previously reduced to a fineness of approximately 90% through a 200-mesh screen or finer, said mixing being carried on in the presence of an amount of water sufficient to insure hydration of any quick lime present and sufficient to insure the presence of free moisture in the mixture throughout the mixing operation, and in the presence of a small percentage of sodium chloride, and, while mixing, maintaining the mixture at a temperature of at least about 100° C., and not exceeding about 400° C., to produce mutual reactions between the lime and the siliceous components of said material.

4. The process of producing a cementitious product which comprises mixing a calcareous material containing lime in a form reactive to silica and alumina with a material selected from the group consisting of silica sands, siliceous earths and clays, and other argillaceous and argillo-calcareous materials generally known to be suitable as the raw materials for supplying the siliceous and aluminous components in Portland cement manufacture, and previously reduced to a fineness of approximately 90% through a 200-mesh screen or finer, said mixing being carried on in the presence of an amount of water sufficient to insure hydration of any quick lime present and sufficient to insure the presence of free moisture in the mixture throughout the mixing operation, and in the presence of a small amount of tannic acid, and, while mixing, maintaining the mixture at a temperature of at least about 100° C., and not exceeding about 400° C., to produce mutual reactions between the lime and the siliceous components of said material.

5. The process of producing a cementitious product which comprises mixing quick lime with diatomaceous earth in the presence of an aqueous sodium chloride solution in amount sufficient to insure hydration of the lime component of the mixture, and then grinding said mixture in the presence of a limited amount of moisture while maintaining the mixture at a temperature of at least about 100° C., and not exceeding about 400° C., as measured by the temperature of the product exiting from the grinding zone, and continuing said treatment until the mixture has been reduced to a state of subdivision of approximately 90% through a 200-mesh screen or finer.

6. The process of producing a cementitious product which comprises mixing quick lime with diatomaceous earth in the presence of water and tannic acid, the amount of water being sufficient to insure hydration of the lime components of the mixture, and then grinding said mixture in the presence of a limited amount of moisture while maintaining the mixture at a temperature of at least about 100° C., and not exceeding about 400° C., as measured by the temperature of the product exiting from the grinding zone, and continuing said treatment until the mixture has been reduced to a state of subdivision of approximately 90% through a 200-mesh screen or finer.

ALTON J. BLANK.